US012393476B2

United States Patent
Ayachitula et al.

(10) Patent No.: US 12,393,476 B2
(45) Date of Patent: Aug. 19, 2025

(54) EARLY DETECTION OF INFORMATION TECHNOLOGY (IT) FAILURES USING MULTIMODAL CORRELATION AND PREDICTION

(71) Applicant: Kyndryl, Inc., New York, NY (US)

(72) Inventors: Naga A. Ayachitula, Dobbs Ferry, NY (US); Rohit Khandekar, Jersey City, NJ (US); Upendra Sharma, Hartsdale, NY (US)

(73) Assignee: Kyndryl, Inc., New York, NY (US)

( * ) Notice: Subject to any disclaimer, the term of this patent is extended or adjusted under 35 U.S.C. 154(b) by 140 days.

(21) Appl. No.: 18/447,512

(22) Filed: Aug. 10, 2023

(65) Prior Publication Data
US 2025/0053469 A1 Feb. 13, 2025

(51) Int. Cl.
*G06F 11/00* (2006.01)
*G06N 5/022* (2023.01)
(52) U.S. Cl.
CPC ............ *G06F 11/004* (2013.01); *G06N 5/022* (2013.01); *G06F 2201/81* (2013.01)

(58) Field of Classification Search
CPC .... G06F 11/004; G06F 11/721; G06F 11/073; G06F 11/0751; G06F 11/0772; G06F 11/0784
See application file for complete search history.

(56) References Cited

U.S. PATENT DOCUMENTS

2020/0210538 A1* 7/2020 Wang ...................... F03D 17/00
2021/0203157 A1* 7/2021 Visweswariah ......... H02J 3/001

* cited by examiner

*Primary Examiner* — Katherine Lin
(74) *Attorney, Agent, or Firm* — CANTOR COLBURN LLP; John Kennel

(57) ABSTRACT

Embodiments relate to early detection of information technology (IT) failures in a computing system. A technique is executed by one or more processors and includes receiving multiple IT records including past and recent historical data, extracting first and second time series sections from the past and recent historical data, respectively, training a failure detection model to correlate metric patterns in the first time series sections with at least one of other metric patterns and previous IT failures and, in response to the training, using the failure detection model to predict at least one of upcoming metric patterns and upcoming IT failures from metric patterns in the second time series sections.

20 Claims, 10 Drawing Sheets

EARLY DETECTION OF INFORMATION TECHNOLOGY (IT) FAILURES USING MULTIMODAL CORRELATION AND PREDICTION

BACKGROUND

The present invention generally relates to computer systems, and more specifically, to computer-implemented methods, computer systems, and computer program products configured and arranged to provide early detection of information technology (IT) failures using multimodal correlation and prediction.

An information technology (IT) ticketing system is a tool used to track IT service requests, events, incidents, and alerts that might require additional action from the IT department. Ticketing software allows organizations to resolve their internal IT issues by streamlining the resolution process. The elements they manage, called tickets, provide context about the issues, including details, categories, and any relevant tags.

The ticket often contains additional contextual details and may also include relevant contact information of the individual who created the ticket. Tickets are usually employee-generated, but automated tickets may also be created when specific incidents occur and are flagged. Once a ticket is created, it is assigned to an IT agent to be resolved. Effective ticketing systems allow tickets to be submitted via a variety of methods. These include submissions through virtual agents, phone, email, service portals, live agents, walk-up experience, etc.

In general, automation systems automate aspects of the environment and problem resolution, event monitoring software monitors components and the environment, and incidents are reported via tickets through the ticketing system. A typical system may use natural language to monitor a ticket and output, via general language classifiers, what the problem is. As such, it is often the case, that a number of tickets will relate to a similar or same problem and could therefore be used to predict certain issues, such as outages, whereas other tickets relate to non-actionable issues that can be ignored.

SUMMARY

Embodiments of the present invention are directed to computer-implemented methods for early detection of information technology (IT) failures in a computing system. A non-limiting example of the computer-implemented method includes receiving multiple IT records including past and recent historical data, extracting first and second time series sections from the past and recent historical data, respectively, training a failure detection model to correlate metric patterns in the first time series sections with at least one of other metric patterns and previous IT failures and, in response to the training, using the failure detection model to predict at least one of upcoming metric patterns and upcoming IT failures from metric patterns in the second time series sections.

Embodiments of the present invention are directed to a system. A non-limiting example of the system includes a memory having computer readable instructions and one or more processors for executing the computer readable instructions. The computer readable instructions control the one or more processors to perform operations for early detection of information technology (IT) failures in a computing system. The operations include receiving multiple IT records comprising past and recent historical data, extracting first and second time series sections from the past and recent historical data, respectively, training a failure detection model to correlate metric patterns in the first time series sections with at least one of other metric patterns and previous IT failures and in response to the training, using the failure detection model to predict at least one of upcoming metric patterns and upcoming IT failures from metric patterns in the second time series section.

Embodiments of the present invention are directed to a computer program product. A non-limiting example of the computer program product includes a computer readable storage medium having program instructions embodied therewith, the program instructions executable by one or more processors to cause the one or more processors to perform operations for early detection of information technology (IT) failures in a computing system. The operations include receiving multiple IT records comprising past and recent historical data, extracting first and second time series sections from the past and recent historical data, respectively, training a failure detection model to correlate metric patterns in the first time series sections with at least one of other metric patterns and previous IT failures and in response to the training, using the failure detection model to predict at least one of upcoming metric patterns and upcoming IT failures from metric patterns in the second time series sections.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

DETAILED DESCRIPTION

Figure 1:
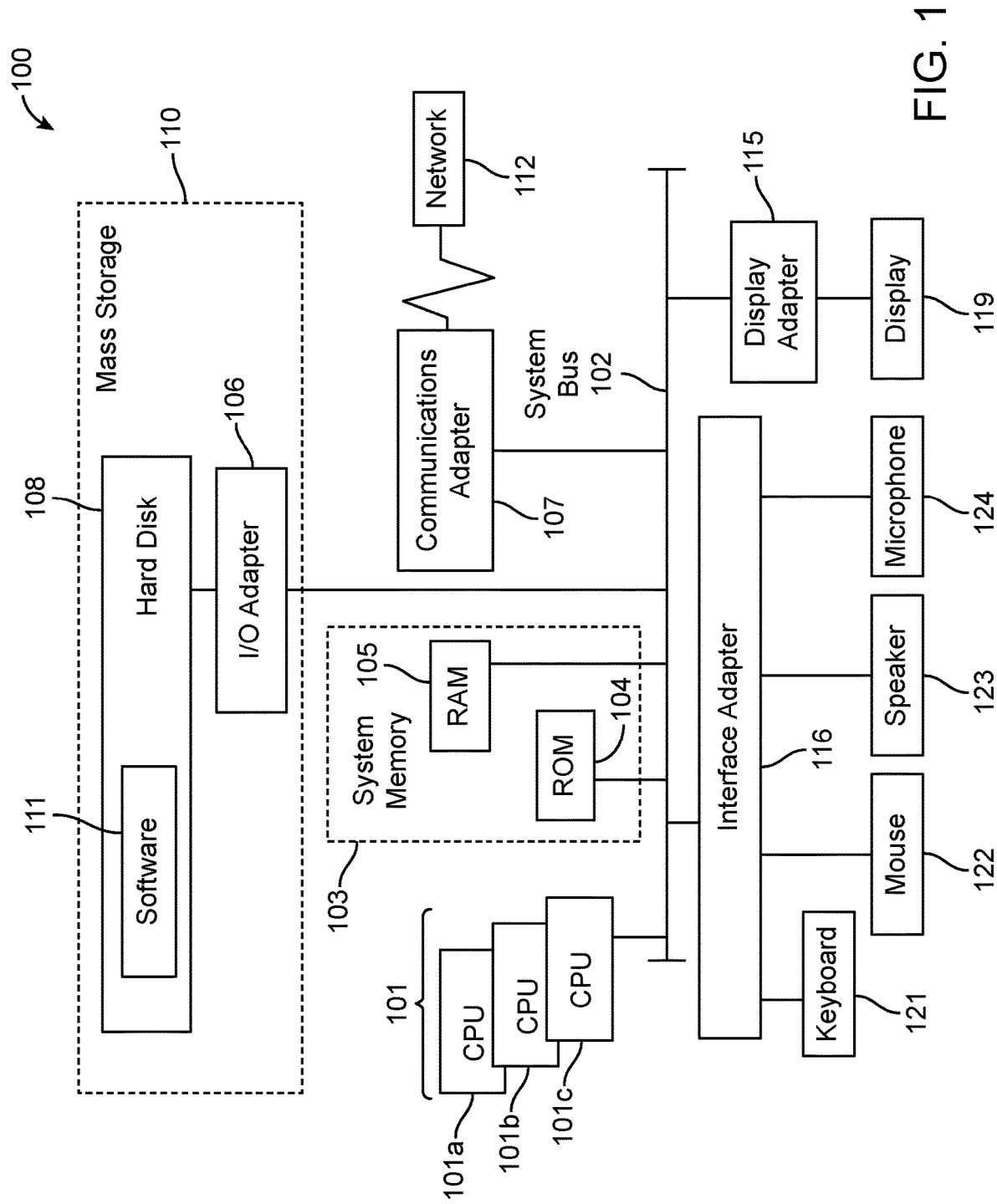
FIG. 1 depicts a block diagram of an example computer system for use in conjunction with one or more embodiments of the present invention.

One or more embodiments provide for automated early detection of information technology (IT) failures in a computing system by receiving multiple IT records comprising past and recent historical data, extracting first and second time series sections from the past and recent historical data, respectively, training a failure detection model to correlate metric patterns in the first time series sections with at least one of other metric patterns and previous IT failures and using the failure detection model, following the training, to predict at least one of upcoming metric patterns and upcoming IT failures from metric patterns in the second time series sections. This can provide an improvement over known methods for IT tracking by providing for a method for early detection of failures and/or issues and a method to detect non-actionable, temporal and/or unnecessary tickets.

Incident identification and automated resolution is the process of managing IT service disruptions and restoring services. For example, a monitoring system monitors the IT environment of a client in an industry. The term "IT environment" refers to the infrastructure, hardware, software and systems that a client (entity or business) relies on every day in the course of using IT. Some of the commonly used resources in an IT environment include computers, internet access, peripheral devices, etc. Examples in the IT environment may include the following: hardware: routers, personal computers, servers, switches and data centers; software: user applications, web servers and applications that make hardware connections effective and useable; and networking: firewalls, cables and other components that facilitate internal and external communication in a business. Upon detection of a technical event in the IT environment and/or upon the request of a user of the IT environment, the monitoring system generates a ticket. The ticket can be sent to an automated resolution system and/or the IT department to be resolved. A ticket is a special document or record that represents an incident, alert, request and/or event that requires action from the IT department. Also, a ticket is an historical document that details a service event, such as an incident, problem and/or service request. Tickets govern and control how a service event is processed.

A typical system may monitor an IT environment and attempt to identify the problem associated with a given ticket. However, while the system may be able to respond in a ticket-by-ticket basis, there is no way for the system to predict upcoming issues and problems based on multiple tickets or to ignore non-actionable, temporal and/or unnecessary tickets.

Technical solutions and benefits include a system that can predict upcoming issues and problems based on multiple tickets and that can ignore non-actionable, temporal and/or unnecessary tickets.

One or more embodiments described herein can utilize machine learning techniques to perform tasks, such as early detection of failures and/or issues and a method to detect non-actionable, temporal and/or unnecessary tickets. More specifically, one or more embodiments described herein can incorporate and utilize rule-based decision making and artificial intelligence (AI) and/or machine learning (ML) reasoning to accomplish the various operations described herein, namely automated early detection of failures and/or issues and automated detection of non-actionable, temporal and/or unnecessary tickets. The phrase "machine learning" broadly describes a function of electronic systems that learn from data. A machine learning system, engine, or module can include a trainable machine learning algorithm that can be trained, such as in an external cloud environment, to learn functional relationships between inputs and outputs, and the resulting model (sometimes referred to as a "trained neural network," "trained model," "a trained classifier," and/or "trained machine learning model") can be used for classifying a feature of interest, for example.

Turning now to FIG. 1, a computer system 100 is generally shown in accordance with one or more embodiments of the invention. The computer system 100 can be an electronic, computer framework including and/or employing any number and combination of computing devices and networks utilizing various communication technologies, as described herein. The computer system 100 can be easily scalable, extensible and modular, with the ability to change to different services or reconfigure some features independently of others. The computer system 100 may be, for example, a server, desktop computer, laptop computer, tablet computer or smartphone. In some examples, computer system 100 may be a cloud computing node. Computer system 100 may be described in the general context of computer system executable instructions, such as program modules, being executed by a computer system. Generally, program modules may include routines, programs, objects, components, logic, data structures and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101a, 101b, 101c, etc., (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS) or its successors like Unified Extensible Firmware Interface (UEFI), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system to coordinate the functions of the various components shown in FIG. 1.

Additional input/output devices are shown as connected to the system bus 102 via a display adapter 115 and an interface adapter 116. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by the display adapter 115, which may include a graphics controller to improve the performance of graphics intensive applications and a video controller. A keyboard 121, a mouse 122, a speaker 123, a microphone 124, etc., can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI) and the Peripheral Component Interconnect Express (PCIe). Thus, as configured in FIG. 1, the computer system 100 includes processing capability in the form of the processors 101, storage capability including the system memory 103 and the mass storage 110, input means such as the keyboard 121, the mouse 122, and the microphone 124, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computer system 100 through the network 112. In some examples, an external computing device may be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
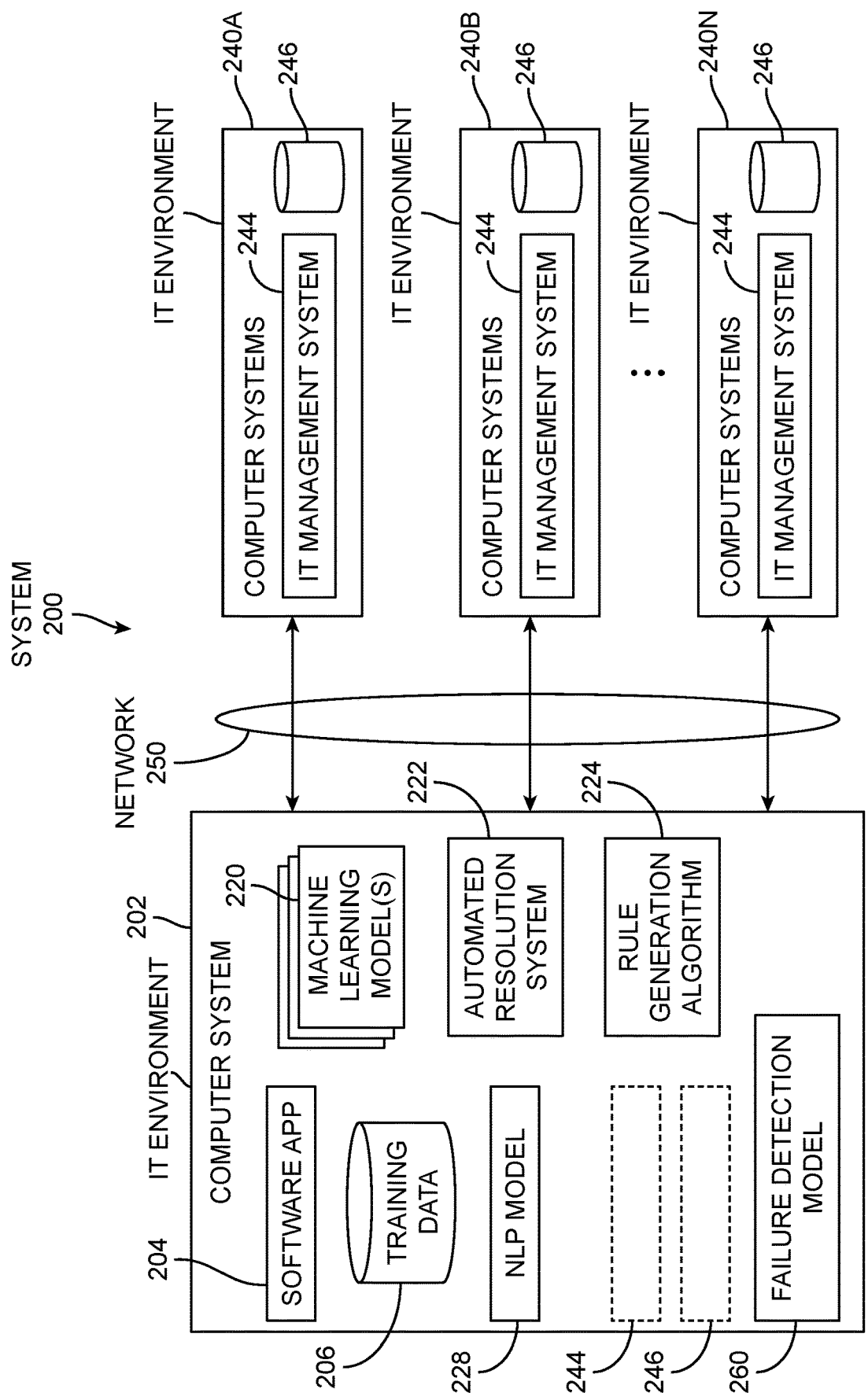
FIG. 2 depicts a block diagram of an example system configured to provide automated text summarization techniques for capturing and conveying information technology (IT) records with numerical data according to one or more embodiments of the present invention.

FIG. 2 depicts a block diagram of an example system 200 configured to provide automated early detection of failures and/or issues and automated detection of non-actionable, temporal and/or unnecessary tickets. The system 200 includes a computer system 202 configured to communicate over a network 250 with many different computer systems, such as a computer system 240A for managing the IT environment for one client in one industry, a computer system 240B for managing the IT environment for another client in another industry, through a computer system 240N for managing the IT environment for yet another client of different industry. The computer systems 240A, 240B, through 240N can generally be referred to as computer systems 240. Each of the computer systems 240 has its own IT management system 244 for monitoring the IT environment for the respective clients of their respective industries and storing their respective tickets and resolutions in ticket repositories 246. The ticket repositories 246 are operable to store a large number of tickets and their respective resolutions for the IT environments of the computer systems 240. The network 250 can be a wired or wireless communication network.

The IT management system 244 may include or be representative of a monitoring and ticketing system and an automated resolution system for each client in the industry. By the software application 204 communicating over the network 250, which can be a wired or wireless communication network, with the computer systems 240, the software application 204 is configured to extract various tickets and their respective resolutions in the ticket repositories 246 from different clients in different industries.

In one or more embodiments, as illustrated with dashed lines, the computer system 202 may include respective IT management systems 244 and their ticket repositories 246 for one or more computer systems 240A-240N in their respective IT environments of clients. The computer system 202 can manage the IT environments of the clients for one or more computer systems 240A-240N. Any portion of the system 200 including the computer system 202 and one or more of the computer systems 240A-240N can be part of a cloud computing environment 50 (depicted in FIG. 8) as discussed further herein.

In system 200, the computer system 202, the computer systems 240A-240N, the IT management systems 244, the software application 204, training data 206, machine learning models 220, automated resolution system 222, rule generation algorithm 224, failure detection model 260, etc., can include and/or use any of the functionality discussed in computer system 100 including various hardware components and various software applications such as software 111 which can be executed as instructions on one or more processors 101 in order to perform actions according to one or more embodiments of the invention. The software application 204 can include, be integrated with, and/or call various other pieces of software, algorithms, application programming interfaces (APIs), etc., to operate as discussed herein. The software application 204 may be representative of numerous software applications.

The tickets and their respective resolutions are stored in repositories, such as storages, as training data 206. The software application 204 filters the training data 206 to ensure that the training data 206 is only in the IT environment, which can also be referred to as the IT domain or IT space. The IT domain encompasses the IT environments of the clients in respective industries. Any tickets that are not related to events (e.g., errors, issues, security breaches, malfunctioning computer equipment, etc.) in the IT domain are removed from the training data 206.

The computer system 202 includes a machine learning model 220, which is a client agnostic machine learning model that has been trained to provide automated abstractive IT summary generation.

In one or more embodiments, the machine learning model 220, rule generation algorithm 224, failure detection model 260, and/or NLP model 228 can include various engines and/or can be implemented on a neural network. The features of the engines can be implemented by configuring and arranging the computer system 202 to execute machine learning algorithms. In general, machine learning algorithms, in effect, extract features from received data (e.g., a ticket of a technical computer problem) in order to "classify" the received data. Examples of suitable classifiers include but are not limited to neural networks, support vector machines (SVMs), logistic regression, decision trees, hidden Markov Models (HMMs), etc. The end result of the classifier's operations, i.e., the "classification," is to predict a class (or label) for the data. The machine learning algorithms apply machine learning techniques to the received data in order to, over time, create/train/update a unique "model." The learning or training performed by the engines/classifiers can be supervised, unsupervised, or a hybrid that includes aspects of supervised and unsupervised learning. Supervised learning is when training data is already available and classified/labeled. Unsupervised learning is when training data is not classified/labeled so must be developed through iterations of the classifier. Unsupervised learning can utilize additional learning/training methods including, for example, clustering, anomaly detection, neural networks, deep learning, and the like.

In one or more embodiments, the engines are implemented as neural networks (or artificial neural networks), which use a connection between a pre-neuron and a post-neuron, thus representing the connection weight. The connection represents, for example, a synapse between a pre-neuron and a post-neuron. Neuromorphic systems are interconnected elements that act as simulated "neurons" and exchange "messages" between each other. Similar to the so-called "plasticity" of synaptic neurotransmitter connections that carry messages between biological neurons, the connections in neuromorphic systems such as neural networks carry electronic messages between simulated neurons, which are provided with numeric weights that correspond to the strength or weakness of a given connection. The weights can be adjusted and tuned based on experience, making neuromorphic systems adaptive to inputs and capable of learning. After being weighted and transformed by a function (i.e., transfer function) determined by the network's designer, the activations of these input neurons are then passed to other downstream neurons, which are often referred to as "hidden" neurons. This process is repeated until an output neuron is activated. Thus, the activated output neuron determines (or "learns") and provides an output or inference regarding the input.

Training datasets (e.g., training data 206) can be utilized to train the machine learning algorithms. The training datasets can include historical data of past tickets and the corresponding options/suggestions/resolutions provided for the respective tickets. Labels of options/suggestions can be applied to respective tickets to train the machine learning algorithms, as part of supervised learning. For the preprocessing, the raw training datasets may be collected and sorted manually. The sorted dataset may be labeled (e.g., using the Amazon Web Services® (AWS®) labeling tool such as Amazon SageMaker® Ground Truth). The training dataset may be divided into training, testing, and validation datasets. Training and validation datasets are used for training and evaluation, while the testing dataset is used after training to test the machine learning model on an unseen dataset. The training dataset may be processed through different data augmentation techniques. Training takes the labeled datasets, base networks, loss functions, and hyperparameters, and once these are all created and compiled, the training of the neural network occurs to eventually result in the trained machine learning model (e.g., trained machine learning algorithms). Once the model is trained, the model (including the adjusted weights) is saved to a file for deployment and/or further testing on the test dataset.

Figure 3:
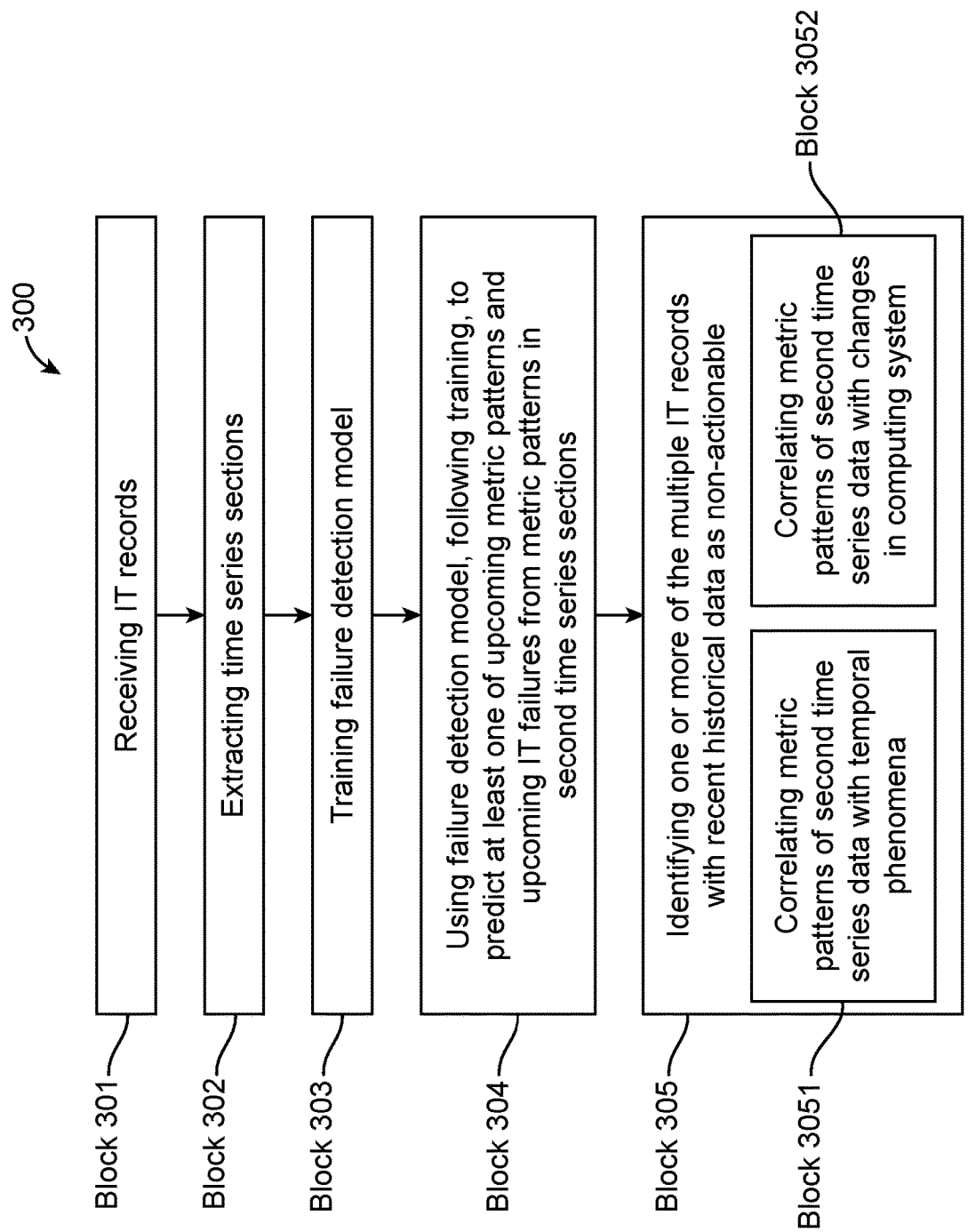
FIG. 3 is a flowchart of a computer-implemented method for early detection of information technology (IT) failures in a computing system in accordance with one or more embodiments of the present invention.

FIG. 3 is a flowchart of a computer-implemented method 300 for early detection of information technology (IT) failures in a computing system. As shown in FIG. 3, the computer-implemented method 300, which is executed by one or more processors, includes receiving multiple IT records including past and recent historical data (block 301), extracting first and second time series sections from the past and recent historical data, respectively (block 302), training a failure detection model 260 to correlate metric patterns in the first time series sections with at least one of other metric patterns and previous IT failures (block 303) and, in response to the training, using the failure detection model 260 to predict at least one of upcoming metric patterns and upcoming IT failures from metric patterns in the second time series sections (block 304). The computer-implemented method 300 can further include identifying one or more of the multiple IT records with the recent historical data as non-actionable (block 305) by at least one of correlating the metric patterns of the second time series data with temporal phenomena (block 3051) and correlating the metric patterns of the second time series data with changes in the computing system (block 3052).

In accordance with embodiments, the metric patterns in the first time series sections correlate with the at least one of the other metric patterns and the previous IT failures in an event values of the metric patterns provide statistically significant information about values of the at least one of the other metric patterns and the previous IT failures, the metric patterns include memory utilization spikes and central processing unit (CPU) spikes and the memory utilization spikes are correlated with and precede the CPU spikes.

Figure 4:
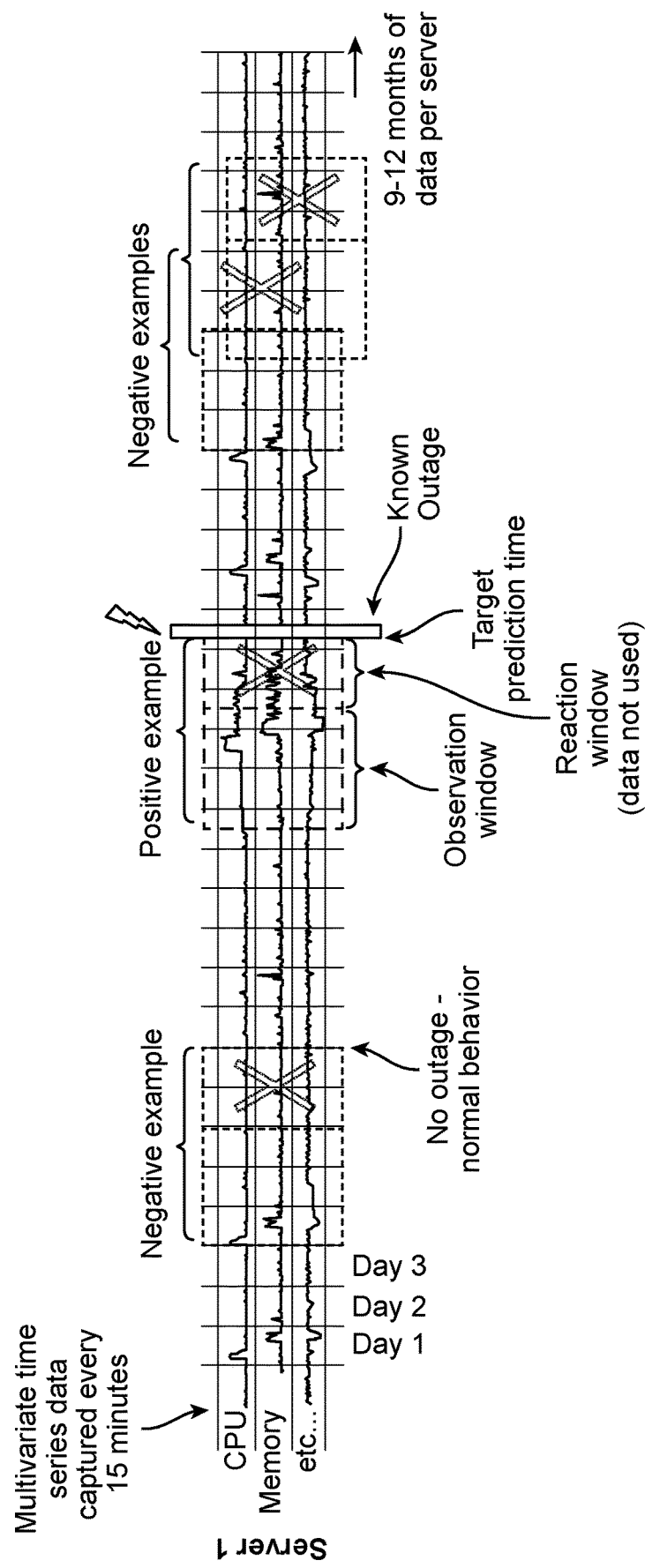
FIG. 4 is a graphical depiction of time series data for use in the computer-implemented method of FIG. 3.

With reference to FIG. 4, the extraction of the first and second time series sections from the past and recent historical data of block 302 and the training of the failure detection model 260 to correlate metric patterns in the first time series sections with at least one of other metric patterns and previous IT failures of block 303 are illustrated graphically. As shown in FIG. 4, for server 1, multi-variate time series data relating to CPU usage, memory usage and additional data, which is taken every fifteen minutes, for example, illustrates that in first, third and fourth negative examples, the multi-variate time series data does not precede and is therefore not predictive of an outage whereas, in a second positive example, the multi-variate time series data precedes and is predictive of an outage.

The failure detection model 260 is a machine learning model that has been trained to correlate metric patterns in a first time series section to other metric patterns and to metric patterns of previous IT failures. The failure detection model 260 is trained to detect metric patterns that correlate to metric patterns of previous IT failures according to CPU usage, memory usage and additional (hardware and software) data in order to detect potential/candidate failures before the failure occurs. In response to detecting the metric patterns of potential/candidate failures in a computer system 240, the software applications 204 causes or instructs the computer system 240, to reduce its CPU usage, memory usage, workload, I/O flow, etc., in order to avoid a computer failure to the computer system 240.

Figure 5:
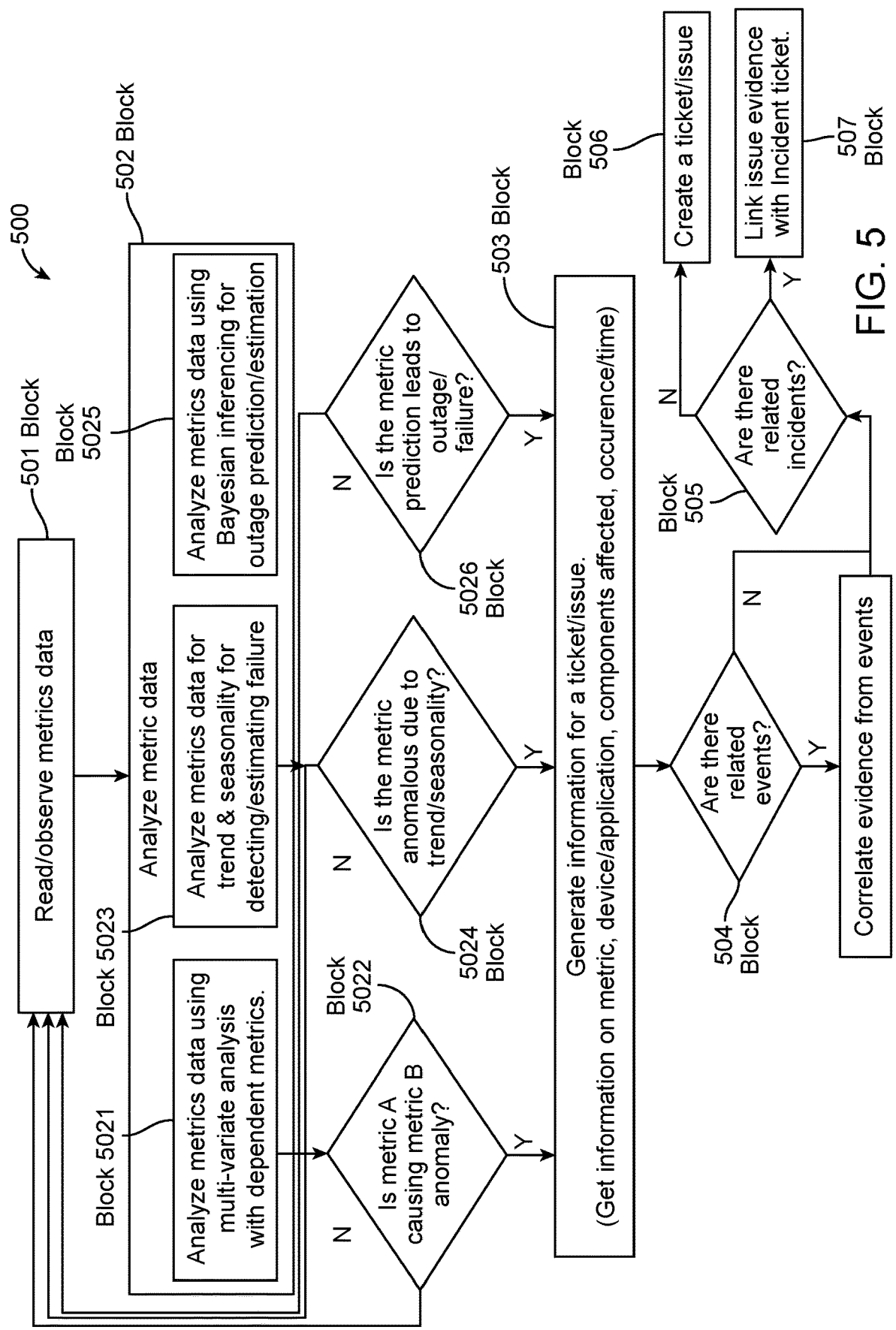
FIG. 5 is a flow diagram illustrating a method of early detection of issues/tickets in accordance with one or more embodiments of the present invention.

With reference to FIG. 5, a method of ticket/issue creation 500 is illustrated as a precursor for the reception of multiple IT records including past and recent historical data (block 301) of the computer-implemented method 300 of FIG. 3. As shown in FIG. 5, metrics data is read and/or observed (block 501) and then analyzed (block 502). The analysis can be executed by using multiple variate analysis with dependent metrics (block 5021) to determine whether one metric is causing another metric (block 5022), for trends and seasonality for detecting and/or estimating failures (block 5023) to determine whether a metric is anomalous due to trends/seasonality (block 5024) and/or using Bayesian inference for outage/estimation (block 5025) to determine whether a metric prediction leads to an outage/failure (block 5026). Results of the analysis of block 502 are then used to generate a ticket/issue (block 503). Subsequently, it is determined whether related events exist (block 504) and whether related incidents exist (block 505) so that a ticket/issue can be created (block 506) and/or so that issue evidence can be linked with a ticket (block 507).

Figure 6:
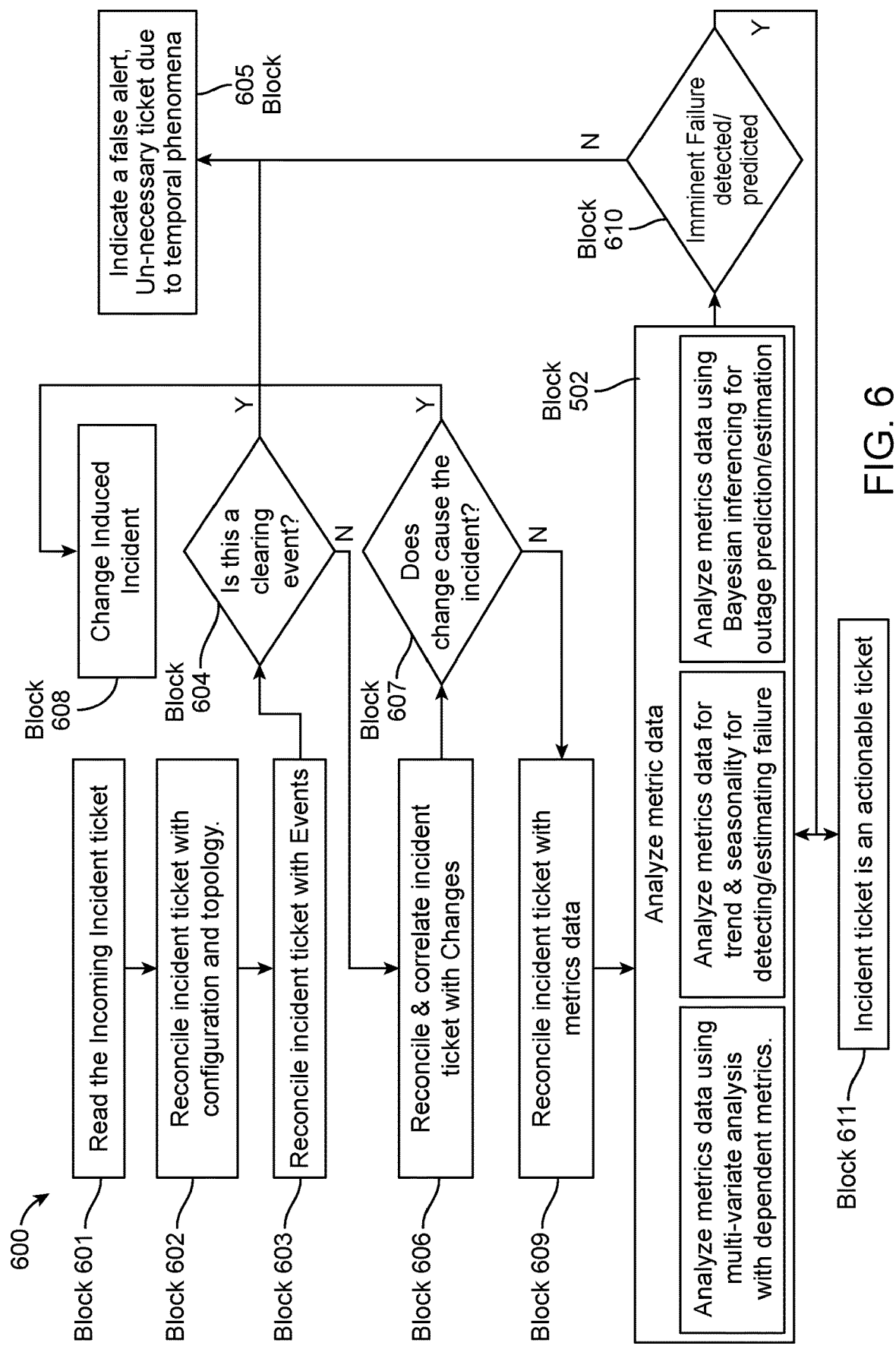
FIG. 6 is a flow diagram illustrating a method of detecting non-actionable, temporal and/or unnecessary tickets in accordance with one or more embodiments of the present invention.

With reference to FIG. 6, a method of detecting non-actionable, temporal and/or unnecessary tickets 600 for the identifying of the one or more of the multiple IT records with the recent historical data as non-actionable of block 305 of the computer-implemented method 300 of FIG. 3 is illustrated. As shown in FIG. 6, an incoming ticket is read (block 601), reconciled with system configuration and topology information (block 602) and reconciled with event information (block 603). At this point, it is determined whether the ticket relates to a clearing event (block 604) and, if so, it is indicated as a non-actionable, temporal and/or unnecessary ticket (block 605). If not, the ticket is reconciled and correlated with changes to the system (block 606), it is determined whether the changes led to the ticket (block 607) and, if so, the ticket is rewritten (block 608). If not, the ticket is reconciled with metric data (block 609) and analyzed as described above. If as a result of the analysis, it is determined that the ticket relates to an imminent failure that is detected/predicted (block 610), the ticket is regarded as an actionable ticket (block 611). If not, the ticket is indicated as a non-actionable, temporal and/or unnecessary ticket (block 605).

Figure 7A:
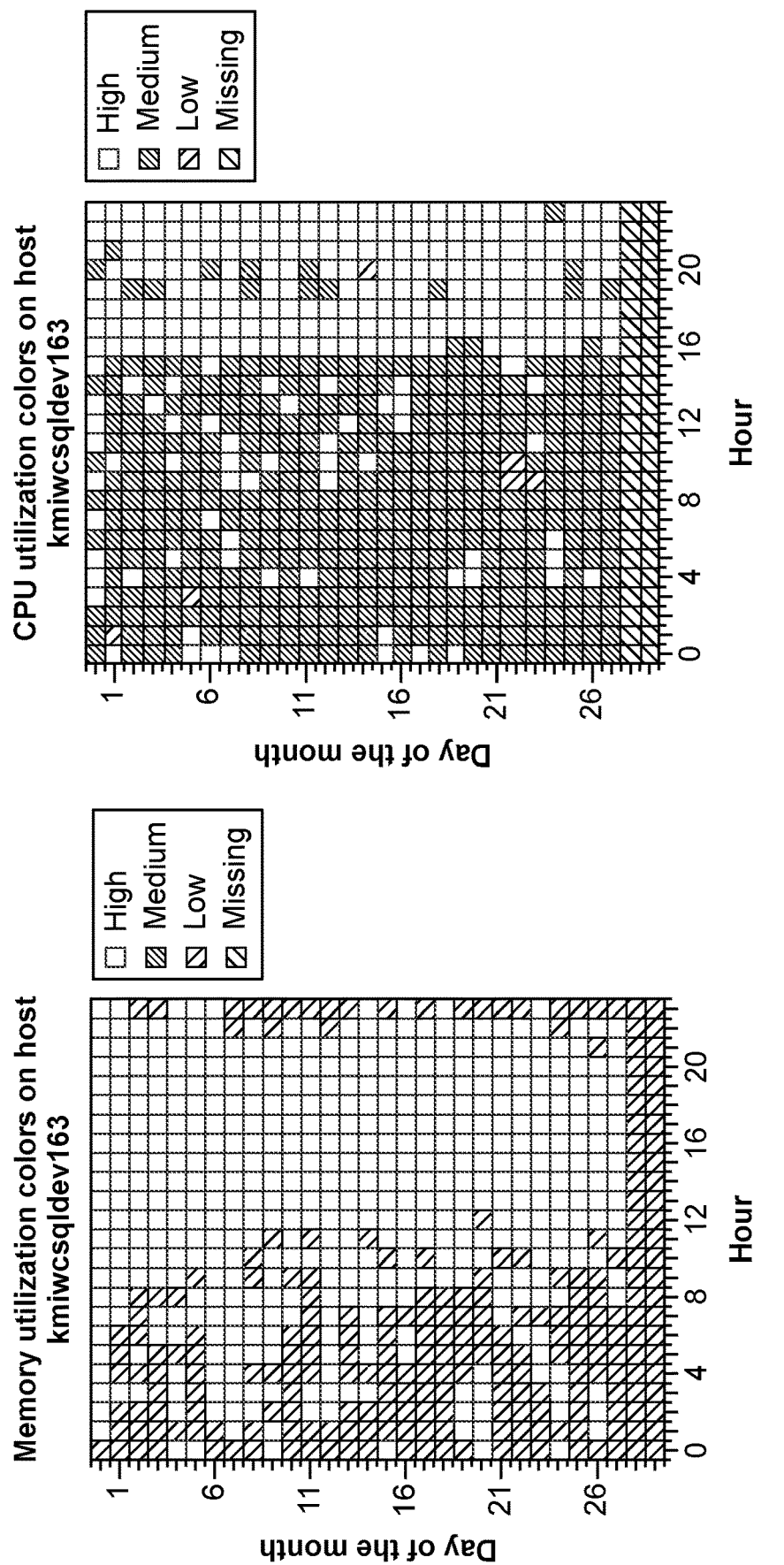
FIGS. 7A and 7B are graphical illustrations of metrics and seasonality in a computing system in accordance with one or more embodiments.
Figure 7B:
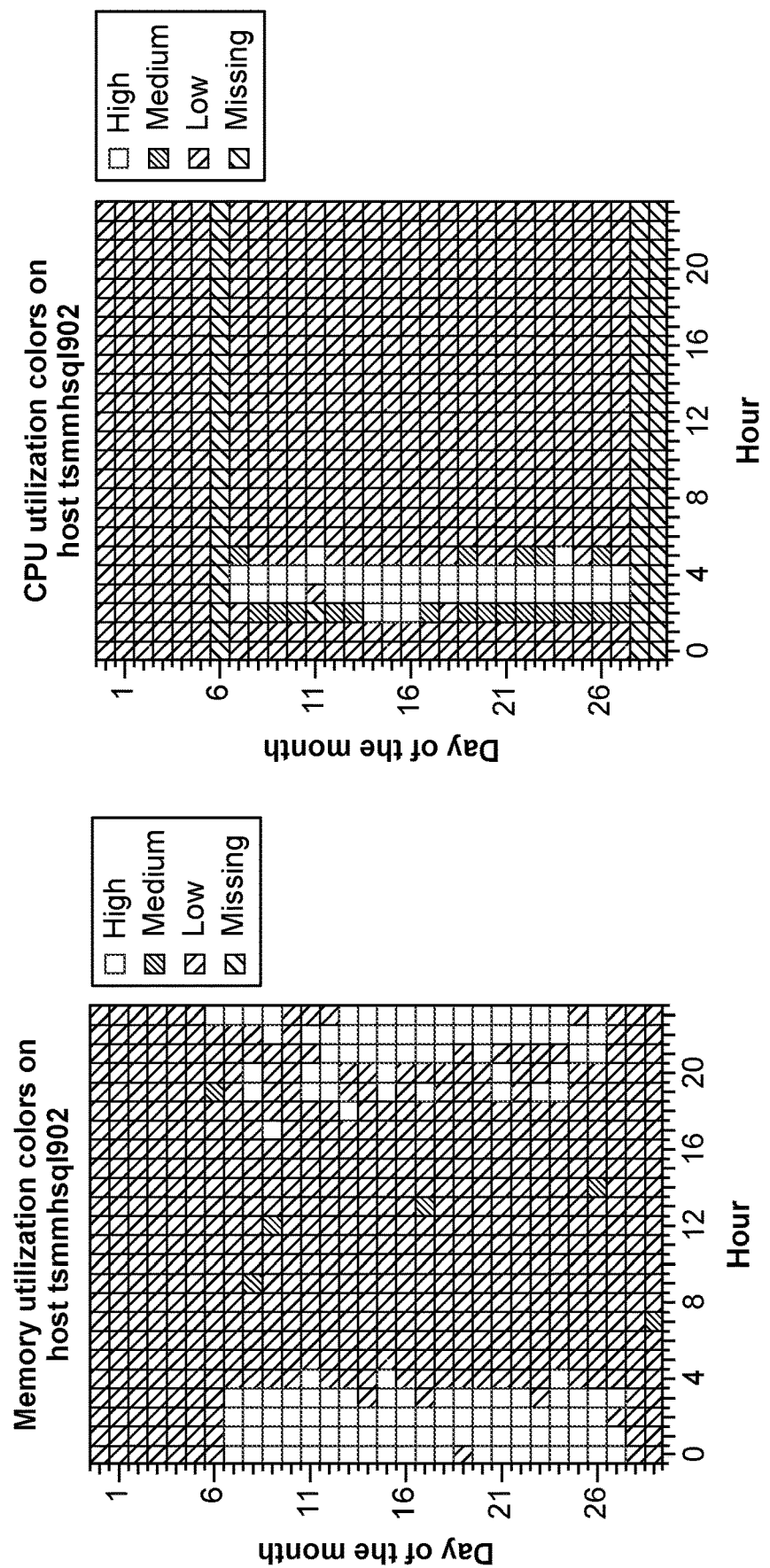

With reference to FIGS. 7A and 7B, time series data of CPU, memory and disk utilizations on IT servers tend to have high autocorrelation, due to the continuous nature of the underlying workloads. One can exploit this to build autoregression models to predict high resource utilizations in the future. For example, one can use lagged CPU utilizations $c(t-k), \ldots, c(t-1), c(t)$ to predict forward CPU utilizations $c(t+1), \ldots, c(t+p)$. Such predictions may be statistically significant at multi-hour or even multi-day horizons. For ease of prediction, one can discretize utilization variables into buckets like "high" (R for red), "medium" (Y for yellow) and "low" (G for green). Since high resource utilizations are often responsible for application failures, outages and incident tickets, one can use these models to predict outages as well. On the other hand, high utilization that lasts for very short periods is often called "transient" loading. Such loads often lead to unnecessary incident tickets. On the other hand, non-transient or "persistent" loads indicate significant risk of failures.

In greater detail, time series data of CPU, memory and disk utilizations are also often correlated due to common root causes like the underlying workloads. There are often lead-lag relationships between multiple resources. For example, memory utilization may peak before CPU utilization does. Such lead-lag relationships can be used in the framework of "Granger Causality" to predict future utilizations. For example, lagged memory utilizations $m(t-k), \ldots, m(t)$ may have residual predictive power, even after accounting for lagged CPU utilizations $c(t-k), \ldots, c(t)$ for predicting forward CPU utilizations $c(t+1), \ldots, c(t+p)$. In such a case, we say that memory utilization "Granger causes" CPU utilization.

At the same time, time series data of CPU, memory and disk utilizations may sometimes exhibit cyclical patterns due to the cyclical nature of underlying workloads. Such patterns may exist at various horizons from minutes to weeks. One can also predict future peak utilizations using such cyclical models if they exist. For example, on a certain host, CPU spikes may occur at hours 23 to 4 on a fixed day of the week. This is an example of a 7-day cycle. Memory spikes can occur hours before the spikes in CPU utilization.

As previously observed, intraday predictive strength of CPU utilization at a given time for future CPU utilization continues to hold at multi-day horizons. The strength of this prediction tends to be the highest at shorter horizons and decreases gradually as the prediction horizon increases however a strength of the prediction at a certain horizon can be stronger than at other shorter horizons due to periodic (or cyclic) patterns. After accounting for the CPU utilization data, memory utilization has a predictive strength for predicting CPU utilization, which implies that memory utilization Granger causes CPU utilization.

A value of a metric for predictions can be calculated as follows:

$$Y(t)=g(t)+s(t)+h(t)+\epsilon_t,$$

where $g(t)$ is the trend function that models non-periodic changes (i.e., two types of growth trends have been captured—(1) growth trend that saturates: for such situations, a piecewise growth logistic model is used to capture this, (2) non-saturating growth trends: a piecewise linear growth rate for such situations) and, in both situations, the changepoints are automatically selected by the algorithm), $s(t)$ is the seasonality function and it has been captured via harmonic regression (i.e., leveraging fourier series to capture periodic effects), $h(t)$ represents holiday effects that occur at irregular schedules and $\epsilon_t$ is the error term that represents the idiosyncratic changes which the model cannot accommodate. Here, observations are regressed against time, including linear and non-linear transformations of time, and decomposition and separate parameters are provided for trend (non-periodic change), seasonality (periodic change) and exogenous features, like holidays.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
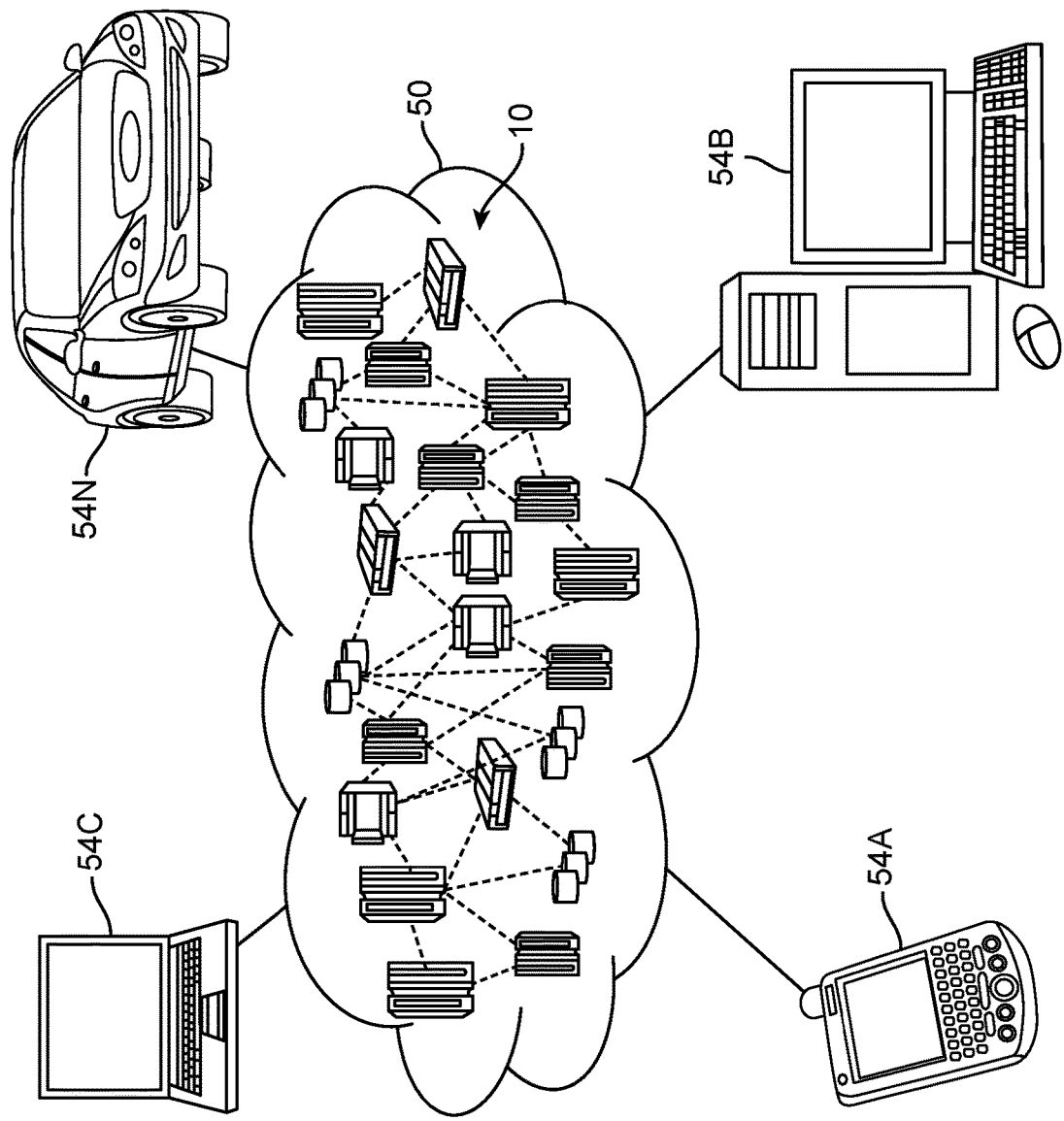
FIG. 8 depicts a cloud computing environment according to one or more embodiments of the present invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described herein above, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
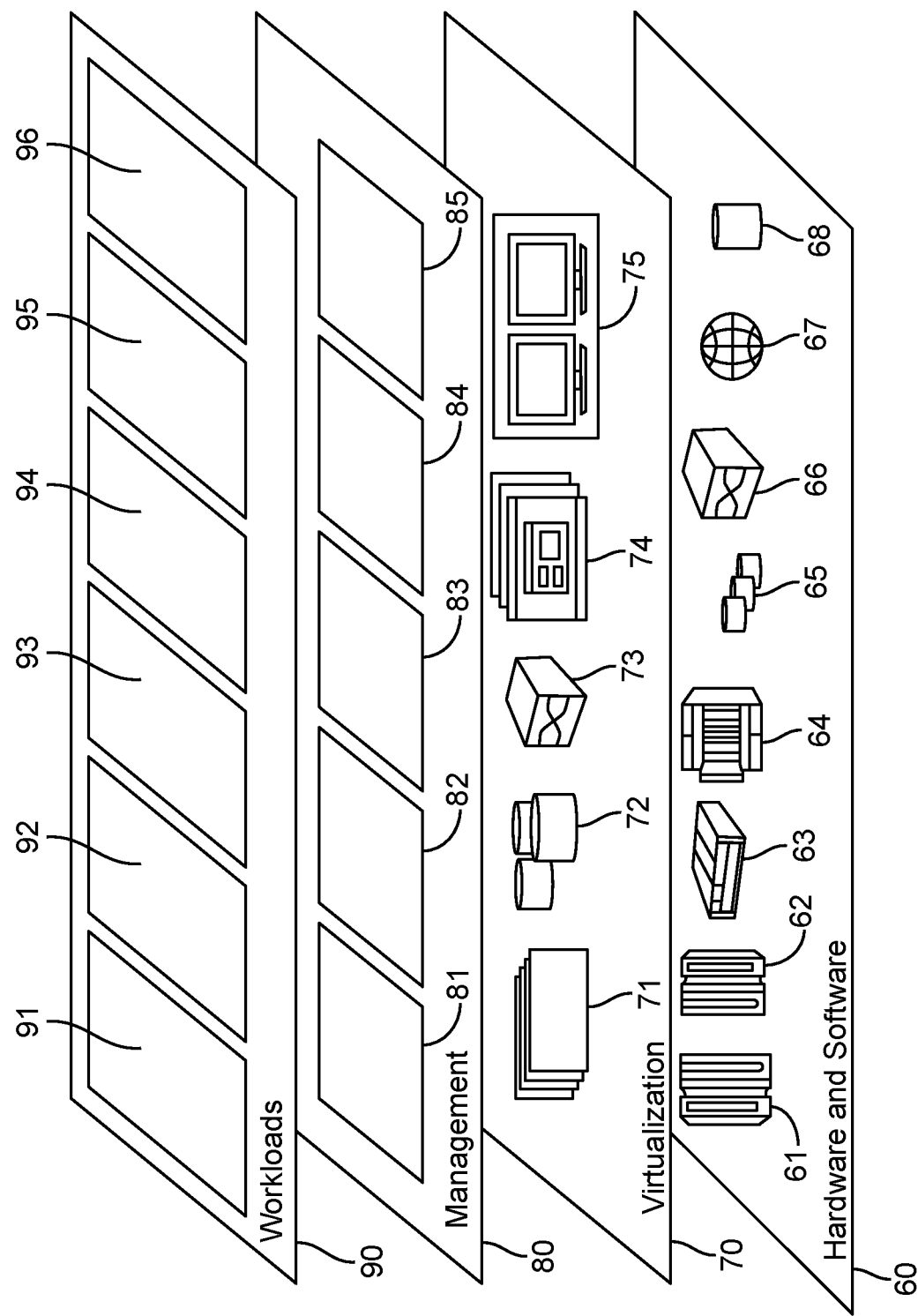
FIG. 9 depicts abstraction model layers according to one or more embodiments of the present invention.

Referring now to FIG. 9, a set of functional abstraction layers provided by cloud computing environment 50 (depicted in FIG. 8) is shown. It should be understood in advance that the components, layers, and functions shown in FIG. 14 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and workloads and functions 96.

Various embodiments of the present invention are described herein with reference to the related drawings. Alternative embodiments can be devised without departing from the scope of this invention. Although various connections and positional relationships (e.g., over, below, adjacent, etc.) are set forth between elements in the following description and in the drawings, persons skilled in the art will recognize that many of the positional relationships described herein are orientation-independent when the described functionality is maintained even though the orientation is changed. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s).

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted, or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for early detection of information technology (IT) failures in a computing system, the computer-implemented method being executed by one or more processors and comprising:
   receiving multiple IT records comprising past and recent historical data;
   extracting first and second time series sections from the past and recent historical data, respectively;
   training a failure detection model to correlate metric patterns in the first time series sections with at least one of other metric patterns and previous IT failures;
   in response to the training, using the failure detection model to predict at least one of upcoming metric patterns and upcoming IT failures from metric patterns in the second time series sections; and
   in response to a detection of the at least one of the metric patterns and the upcoming IT failures, automatically reducing central processing unit (CPU) usage, memory usage, workload, input/output (I/O) flow of the computing system to avoid the at least one of the metric patterns and the upcoming IT failures of computing system.

2. The computer-implemented method according to claim 1, further comprising identifying one or more of the multiple IT records with the recent historical data as non-actionable.

3. The computer-implemented method according to claim 2, wherein the identifying comprises correlating the metric patterns of the second time series data with temporal phenomena.

4. The computer-implemented method according to claim 2, wherein the identifying comprises correlating the metric patterns of the second time series data with changes in the computing system.

5. The computer-implemented method according to claim 1, wherein the metric patterns in the first time series sections correlate with the at least one of the other metric patterns and the previous IT failures in an event values of the metric patterns provide statistically significant information about values of the at least one of the other metric patterns and the previous IT failures.

6. The computer-implemented method according to claim 1, wherein the metric patterns comprise memory utilization spikes and central processing unit (CPU) spikes.

7. The computer-implemented method according to claim 6, wherein the memory utilization spikes are correlated with and precede the CPU spikes.

8. A system comprising:
   a memory having computer readable instructions; and
   one or more processors for executing the computer readable instructions, the computer readable instructions controlling the one or more processors to perform operations for early detection of information technology (IT) failures in a computing system comprising:
      receiving multiple IT records comprising past and recent historical data;
      extracting first and second time series sections from the past and recent historical data, respectively;
      training a failure detection model to correlate metric patterns in the first time series sections with at least one of other metric patterns and previous IT failures;
      in response to the training, using the failure detection model to predict at least one of upcoming metric patterns and upcoming IT failures from metric patterns in the second time series sections; and
      in response to a detection of the at least one of the metric patterns and the upcoming IT failures, automatically reducing central processing unit (CPU) usage, memory usage, workload, input/output (I/O) flow of the computing system to avoid the at least one of the metric patterns and the upcoming IT failures of computing system.

9. The system according to claim 8, wherein the operations further comprise identifying one or more of the multiple IT records with the recent historical data as non-actionable.

10. The system according to claim 9, wherein the identifying comprises correlating the metric patterns of the second time series data with temporal phenomena.

11. The system according to claim 9, wherein the identifying comprises correlating the metric patterns of the second time series data with changes in the computing system.

12. The system according to claim 8, wherein the metric patterns in the first time series sections correlate with the at least one of the other metric patterns and the previous IT failures in an event values of the metric patterns provide statistically significant information about values of the at least one of the other metric patterns and the previous IT failures.

13. The system according to claim 8, wherein the metric patterns comprise memory utilization spikes and central processing unit (CPU) spikes.

14. The system method according to claim 13, wherein the memory utilization spikes are correlated with and precede the CPU spikes.

15. A computer program product comprising a computer readable storage medium having program instructions embodied therewith, the program instructions executable by one or more processors to cause the one or more processors to perform operations for early detection of information technology (IT) failures in a computing system comprising:
   receiving multiple IT records comprising past and recent historical data;
   extracting first and second time series sections from the past and recent historical data, respectively;
   training a failure detection model to correlate metric patterns in the first time series sections with at least one of other metric patterns and previous IT failures;
   in response to the training, using the failure detection model to predict at least one of upcoming metric patterns and upcoming IT failures from metric patterns in the second time series sections; and
   in response to a detection of the at least one of the metric patterns and the upcoming IT failures, automatically reducing central processing unit (CPU) usage, memory usage, workload, input/output (I/O) flow of the computing system to avoid the at least one of the metric patterns and the upcoming IT failures of computing system.

16. The computer program product according to claim 15, further comprising identifying one or more of the multiple IT records with the recent historical data as non-actionable.

17. The computer program product according to claim 16, wherein the identifying comprises correlating the metric patterns of the second time series data with temporal phenomena.

18. The computer program product according to claim 16, wherein the identifying comprises correlating the metric patterns of the second time series data with changes in the computing system.

19. The computer program product according to claim 15, wherein the metric patterns in the first time series sections correlate with the at least one of the other metric patterns and the previous IT failures in an event values of the metric patterns provide statistically significant information about values of the at least one of the other metric patterns and the previous IT failures.

20. The computer program product according to claim 15, wherein the metric patterns comprise memory utilization spikes and central processing unit (CPU) spikes and the memory utilization spikes are correlated with and precede the CPU spikes.

\* \* \* \* \*